United States Patent
Seko et al.

(10) Patent No.: US 6,985,236 B2
(45) Date of Patent: Jan. 10, 2006

(54) POSITION MEASUREMENT SYSTEM

(75) Inventors: Yasuji Seko, Nakai-machi (JP);
Kazumasa Murai, Nakai-machi (JP);
Jun Miyazaki, Nakai-machi (JP);
Hiroyuki Hotta, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 140 days.

(21) Appl. No.: 10/660,582

(22) Filed: Sep. 12, 2003

(65) Prior Publication Data

US 2004/0051880 A1    Mar. 18, 2004

(30) Foreign Application Priority Data

Jan. 8, 2003 (JP) .............................. 2003-002073

(51) Int. Cl.
*G01B 9/02* (2006.01)

(52) U.S. Cl. ............................................. 356/498

(58) Field of Classification Search ............... 356/519, 356/614, 615, 622, 141.5, 498, 496, 450; 250/559.29, 206.1, 221, 222.1

See application file for complete search history.

(56) References Cited

U.S. PATENT DOCUMENTS 4,627,722 A * 12/1986 Falk et al. ............... 356/141.5
5,640,241 A * 6/1997 Ogawa ........................ 356/615

OTHER PUBLICATIONS

"Light Interference Lens Method" Yasuji Seko; 63$^{rd}$ Autumn Meeting of the Japan Society of Applied Physics and Related Societies, Proceedings (Sep. 2002), 24p-ZN-7.

* cited by examiner

Primary Examiner—Gregory J. Toatley, Jr.
Assistant Examiner—Sarah J. Chisdes
(74) Attorney, Agent, or Firm—Oliff & Berridge, PLC (57) ABSTRACT

A position measurement system optically measures a position of an object in a simple manner at low cost. The position measurement system includes: a light source; an optical lens with a large spherical aberration which transmits light from the light source and forms a light ring due to its spherical aberration; a light receiving device (CCD sensor) which detects the light ring as formed by the optical lens; and a calculator which measures a position of the light source according to detected information on the light ring as detected by the CCD sensor. An optical mirror with a large spherical aberration may be used instead of the optical lens.

20 Claims, 7 Drawing Sheets

POSITION MEASUREMENT SYSTEM

BACKGROUND OF THE INVENTION

1. Field of the Invention

The present invention relates to a position measurement, i.e. position determining, system that measures the three-dimensional position of an object (including one-dimensional and two-dimensional positions) using a light emitter and an optical lens.

2. Description of Related Art

A frequently used method of measuring the three-dimensional position of a luminous object (or a high-luminance object) is as follows: a luminous object is photographed with two digital cameras and the coordinates of the luminous object are calculated with the distance between the two cameras as a base line under the principle of triangulation. However, this method requires at least two cameras and may be costly. In addition, since the focus of the camera lens must be adjusted accurately before photographing the object, only up to ten shots can be taken in one second. Also, the position of a quickly moving object cannot be measured because focusing cannot be done so quickly. Another problem is that poor focusing may result in serious deterioration in positional precision or resolution.

Another popular approach to measuring the position of a luminous object with high precision is a light interference method. One typical light interference method takes the following steps: light from a laser light source is split into two sub-beams by a beam splitter or the like; one of the sub-beams is cast on the object and the other sub-beam is reflected as reference light by a mirror and returned to the original optical path; and the reflected light from the object and the reference light are overlapped to cause interference. One advantage of this method is that it is possible to measure the position or displacement of the object at a sub-wavelength resolution. However, since it requires optical components such as a beam splitter and a reflection mirror and uses many components, it is costly. In addition, these components must be assembled with a high positioning accuracy. In short, this method is laborious and expensive. Furthermore, it also has drawbacks that an automatic focusing mechanism is needed and measurement at high speed is difficult. Another problem is that since laser beam is shaped into a spot or line before being thrown on an object, safety measures must be taken.

As a new position measurement method, a light interference lens method is proposed in the following reference:

The 63rd Autumn Meeting of the Japan Society of Applied Physics and Related Societies, Proceedings (Sep. 2002), 871 pages, 24p-ZN-7, New photometry "Light Interference Lens Method" by Yasuji Seko In this technique, light from a semiconductor laser light source is concentrated by an optical lens to form a concentric moiré (interference) pattern on a CCD sensor and thereby measure the position of the light source. In order to form a concentric light interference moiré pattern, this technique takes advantage of the spherical aberration of a lens or uses a bifocal lens and lets light rays overlap on the CCD sensor. The light intensity of this moiré pattern sharply varies between zero and peak and the variation can be detected by an ordinary CCD sensor with high sensitivity so that the position of the light source can be measured with high resolution. In addition, the moiré pattern always appears as a clear image regardless of the distance of the light source, which makes focusing work unnecessary.

In sum, various conventional methods of measuring the three-dimensional position of a luminous object (or a high-luminance object) with high precision and high resolution have various problems: in one method, two cameras with an automatic focusing mechanism are needed, posing the problem of high cost, or high speed measurement is impossible because of required focusing time; and in another method, a laser is used and safety measures must be taken. In the light interference lens method, it is complicated work to calculate the position from a moiré pattern.

SUMMARY OF THE INVENTION

The present invention has been made in view of the above circumstances and provides a position measurement system, i.e. position determining system, that optically measures or determines the position of an object in a simple manner at low cost.

The present invention provides a position measurement system which includes: a light source; an optical lens system which transmits light from the light source and forms an area of light concentration due to its spherical aberration; a light receiving device which detects the area of light concentration as formed by the optical lens system; and a calculator which measures a position of the light source according to detected information on the area of light concentration as detected by the light receiving device.

The area of light concentration has, for example, a shape of a light ring. Concretely it may be circular or oval or have a similar shape. Preferably, the optical lens system may be a convex lens having a first surface for light entrance and a second surface for light exit, where the first or second surface is a spherical surface with a curvature radius R; and a diameter of the lens, $\phi$, is R/4 or more. A thickness of a center of the lens may be equal to or larger than the curvature radius R. The lens may be a semispherical lens as a semispherical body as obtained by halving a spherical body or part of a semispherical body, where its first surface is flat and its second surface is spherical.

The area of light concentration may have a shape of a light line. The optical lens system may be the convex lens having a first surface for light entrance and the second surface for light exit, where the first or second surface has a cylindrical surface with the curvature radius R. Or, the optical lens system may be a lens having a first surface for light entrance and a second surface for light exit, where the first surface is a concave surface and the second surface is a convex and spherical or cylindrical surface. Or the optical lens system may be the lens having the first surface for light entrance and the second surface for light exit, where the first surface is a convex and spherical or cylindrical surface and the second surface is a flat surface; and the light receiving device is tightly attached to the second surface. Or the optical lens system may have a spherical lens, a cylindrical lens or a barrel lens.

Alternatively, according to the present invention, a position measurement system includes: a light source; an optical mirror system which reflects light from the light source and forms an area of light concentration due to its spherical aberration; a light receiving device which detects the area of light concentration as formed by the optical mirror system; and a calculator which measures a position of the light source according to detected information on the area of light concentration as detected by the light receiving device. The area of light concentration may have a shape of a light ring.

The optical mirror system may be a spherical mirror with a curvature radius R and a diameter, φ, of the mirror may be R/5 or more.

The light source may be mounted in a moving body. The light source may have plural light sources which are different in emission wavelength or time-series emission pattern. The light source may be a light reflecting member which reflects light from outside. The light receiving device may be a digital camera having a focusing optical system. There may be a light diffusing member between the optical lens system or optical mirror system and the light receiving device.

A system thus constituted optically measures the position of an object in a simple manner at low cost.

BRIEF DESCRIPTION OF THE DRAWINGS

The invention will be more particularly described with reference to the accompanying drawings, in which.

DESCRIPTION OF THE PREFERRED EMBODIMENTS

Figure 1:
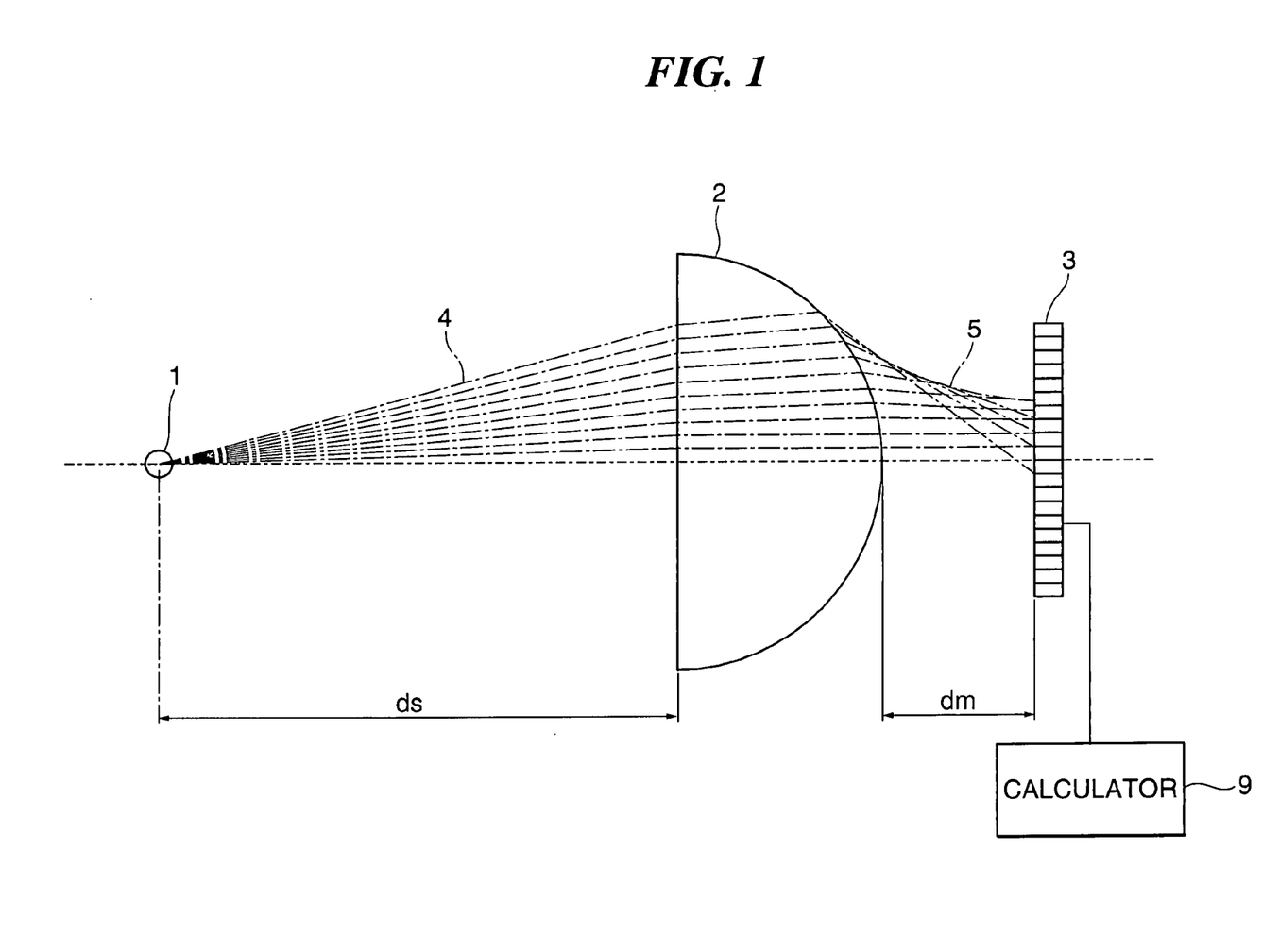
FIG. 1 shows a position measurement system according to an embodiment of the present invention.

FIG. 1 shows a position measurement system according to an embodiment of the present invention. Preferred embodiments of the invention will be explained next. Prior to the explanation, the principle of the present invention is described here with reference to this figure, taking as an example a case that an area where light concentrates (for example, a light ring) is formed on a light receiving surface using a semispherical lens with a large spherical aberration.

Referring to FIG. 1, light rays emitted from a point light source 1 impinge on the first (flat) surface of a semispherical lens 2 as light ray locus 4 indicates. The rays are refracted according to Snell's law. Then, the rays reach the second (spherical) surface of the lens and undergo a refraction bend. Since the second surface is spherical, the rays converge on the optical axis. However, because of the lens' large spherical aberration, the rays converge on not one point but an area, as light ray locus 5 indicates. Looking at the traces of the rays, rays which pass through a lens inside area closer to the optical axis converge on points remoter from the lens on the optical axis; on the other hand, rays which pass through a lens inside area remoter from the optical axis converge on points closer to the lens on the optical axis. Hence, when there is a light receiving surface of a light receiving device 3 like a CCD sensor on the optical axis as shown in FIG. 1, when rays are remoter from the optical axis of the lens, the points where they hit the light receiving surface are remoter from the optical axis; however, when rays are further remoter from the optical axis of the lens, the points where they reach the light receiving surface begin to come closer to the optical axis because the refractive index of the lens is larger. In other words, when rays passing through the lens are remoter from the optical axis, they reach the light receiving surface at points remoter from the optical axis, but when rays further remote from the optical axis reach the light receiving surface, they turn and come closer to the optical axis and some go beyond the optical axis into the opposite side. On the light receiving surface as a two-dimensional plane, the rays turn in this way, forming a circle with the optical axis as the center; and the light rays tend to concentrate around the turning point, forming a light ring. The light intensity distribution of this light ring was found by a simulation as described below.

Figure 2:
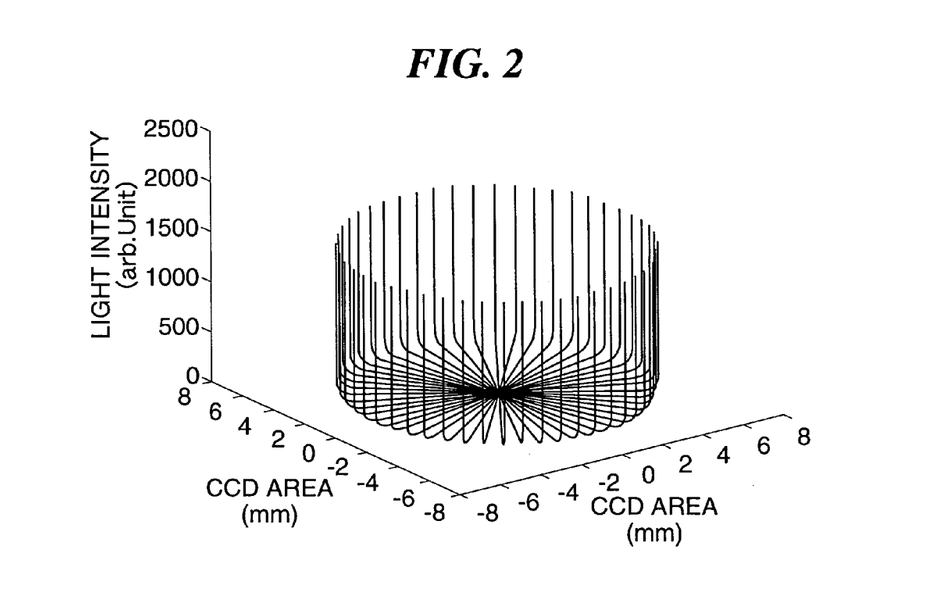
FIG. 2 shows the result of light ring simulation by a semispherical lens.

FIG. 2 shows the result of light ring simulation by a semispherical lens. In this simulation, the optical lens (semi-spherical lens) has a flat (first) surface and a convex (second) surface with a curvature radius (R) of 20 mm and has a refractive index (n) of 1.51. A point light source is located on the lens optical axis at a distance of 100 mm from the first surface of the lens. The light receiving surface of a light receiving device (CCD sensor) is 14.3 mm away from the second surface of the lens and perpendicular to the optical axis. An aperture diaphragm with a radius of 12 mm is attached on the first surface of the lens to make incident light on the lens a circle with a radius of 12 mm while cutting off rays outside the circle. As illustrated in FIG. 2, the light intensities at the ring's outermost area are extremely high as compared with its other areas, with a sudden drop in the light intensity from the outermost area toward the inner area. Therefore, a thin-line light ring is formed. If the light source is on the optical axis, this light ring is a perfect circle; as the distance of the light source from the lens increases, the diameter of the ring decreases and vice versa. When the light source moves perpendicularly to the optical axis, the whole light ring moves in the direction opposite to the direction of movement of the light source. Hence, when the relation between the light source position and the shape or coordinates of the light ring is formulated, a calculator 9 as shown in FIG. 1 can calculate (measure) the coordinates of the light source according to signals concerning the shape or coordinates of the light ring. The measurement method will be concretely stated later. In this case, an explanation has been made of a light ring; however, the invention is not limited thereto. For example, it is possible to measure the position of a light source according to detected information on an area of light concentration, such as an oval ring or a light line (linear light).

According to the present invention, a position measurement system includes: a light source 1; an optical lens system 2 which transmits light from the light source 1 and forms an area of light concentration due to its spherical aberration; a light receiving device 3 which detects an area of light concentration as formed by the optical lens system 2; and a calculator 9 which measures the position of the light source 1 according to detected information on the area of light concentration as detected by the light receiving device 3.

(Embodiment 1)

The first embodiment concerns the result of an experiment in which light from an LED light source was concentrated by a semispherical lens to form a light ring, which was then detected by a CCD line sensor. The conditions of the experiment are as follows. The semispherical lens is a plane-convex lens which has a curvature radius (R) of 20 mm, a diameter of 36 mm, a thickness of 20 mm and a refractive index of 1.51. The first surface of the lens where light enters it is flat while its second surface where light exits it is spherical. The distance between the LED light source and the lens' first surface is 100 mm, and the distance between the lens' second surface and the CCD line sensor is 14.3 mm. The LED light source employed is an LED with a wavelength of 670 nm. The CCD line sensor employed is a 35 mm-long one-dimensional sensor having 7,500 CCD picture elements arranged with a pitch of 4.5 μm.

Figure 3:
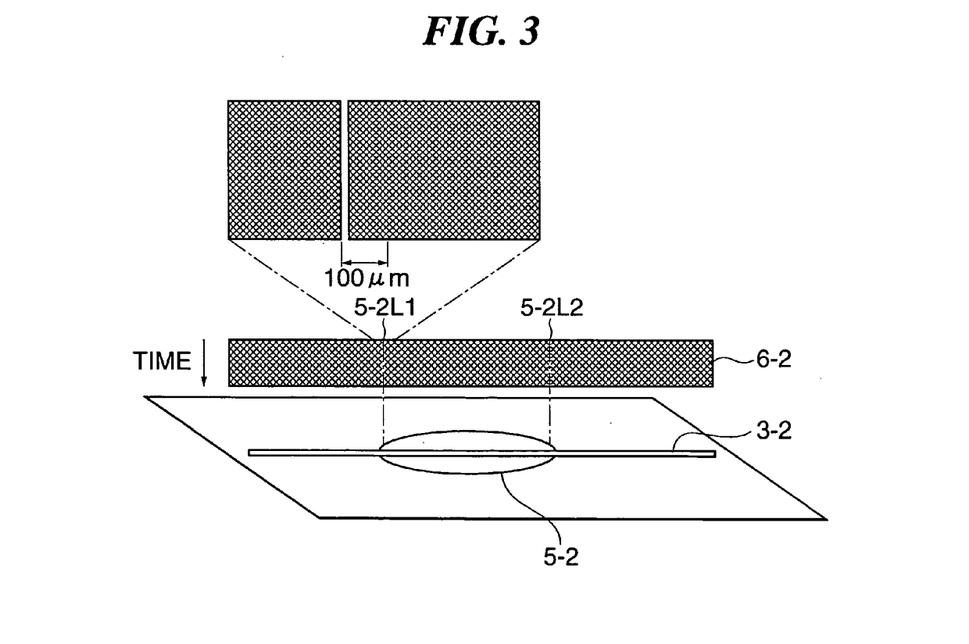
FIG. 3 shows an image captured by a CCD line sensor.

FIG. 3 shows an image which was captured by the CCD line sensor under the abovementioned conditions. Concerning the coordinates of the image 6-2, the horizontal axis represents an image captured by the picture elements and the vertical axis is a time axis. In other words, the image is formed of a vertical array of CCD line outputs made continuously in time. Two white lines 5-2L1 and 5-2L2 with an interval between them are observed in the CCD image 6-2. These white lines correspond to cross sections of the light ring. The diameter of the light ring was 12.6 mm, which coincides with the simulation result shown in FIG. 2. This suggests that the formation of a light ring which takes advantage of the lens' spherical aberration can be accurately predicted by a simulation. As can be understood from an enlarged view of the white line 5-2L1 in the CCD image which is given just above the image in the figure, the line width of the light ring is far smaller than 100 μm. Thanks to this thinness of the line, the CCD sensor can detect movement of the light ring sensitively.

Figure 4:
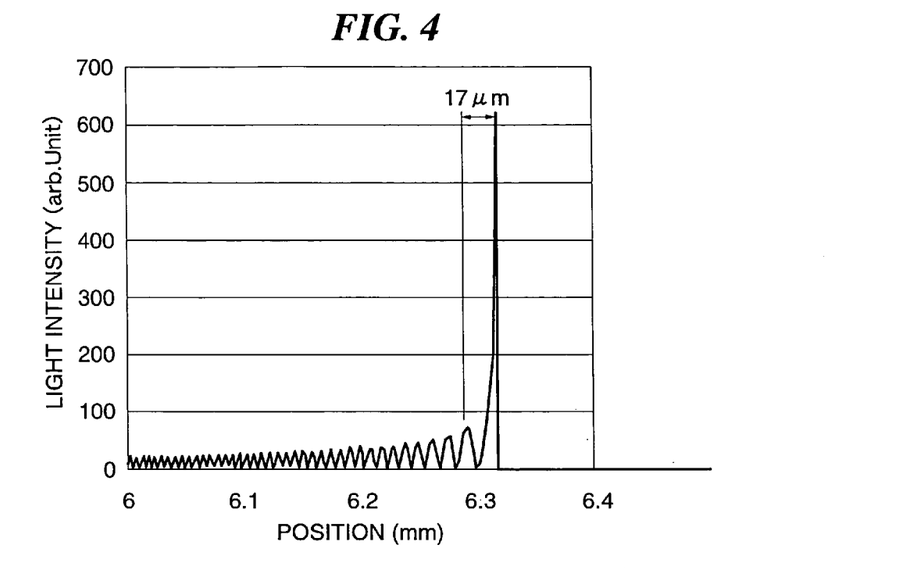
FIG. 4 is a graph showing the result of a simulation of a light ring cross section.

In the enlarged view of the CCD image, a shading pattern like a moiré pattern was observed. Hence, a simulation was made on the assumption that light rays emitted from the LED light source overlap on the CCD due to the lens' spherical aberration and consequently light interference occurs. FIG. 4 shows the result of the simulation. Because the interference intervals in the simulation coincide with the shading pattern intervals, it has been confirmed that the image captured by the CCD is a phenomenon of interference attributable to overlapping of light rays caused by the lens' spherical aberration. Accordingly, it has been found that when a light ring is formed due to the spherical aberration of a lens, interference can be observed even with an LED with a short coherence length.

(Embodiment 2)

Figure 5:
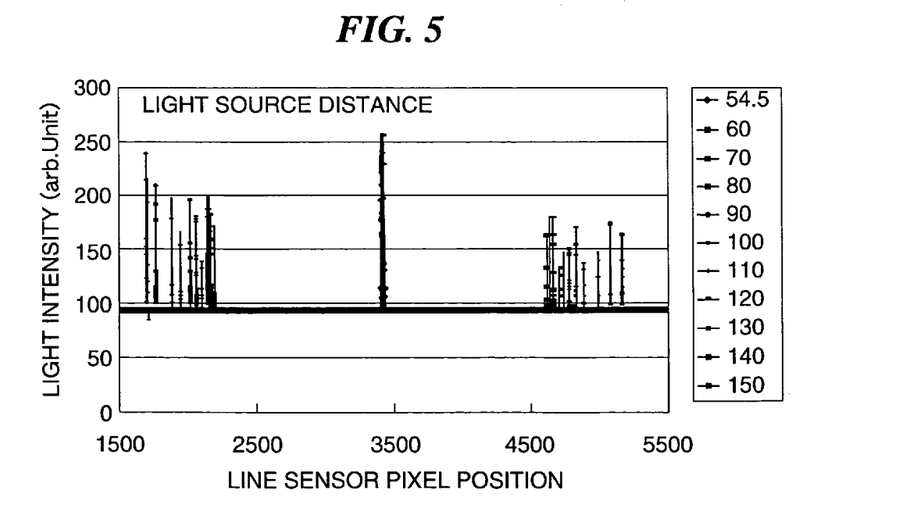
FIG. 5 is a graph showing the light intensity distribution of a light ring cross section captured by a line sensor.
Figure 6:
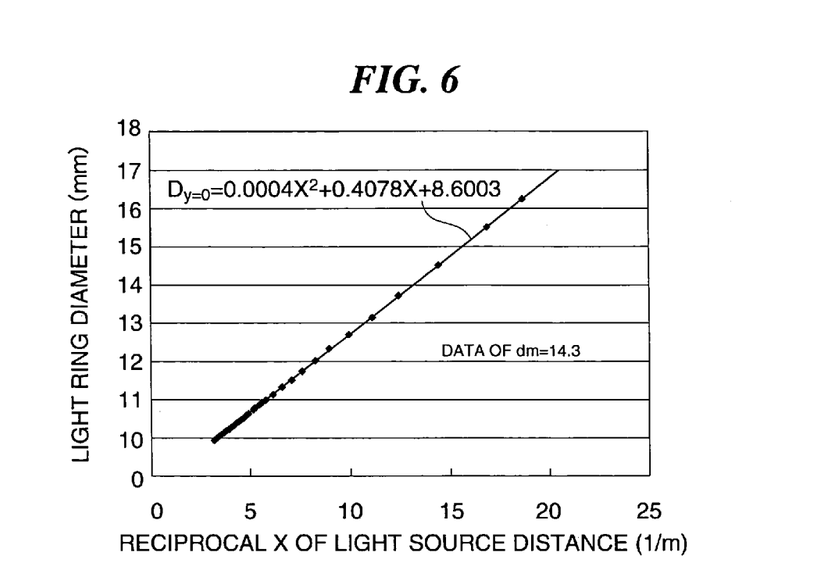
FIG. 6 is a graph showing the relation between the distance of a light source on the optical axis and the optical ring diameter.

The second embodiment concerns a case that the position of a light source is measured in a situation that the same semispherical lens as in the first embodiment is used and the light source is a semiconductor laser and moves on a two-dimensional plane. The wavelength of the semiconductor laser employed is 670 nm. The light receiving device employed is the same CCD line sensor as used in the first embodiment. The CCD line sensor intersects with the optical axis at its center and the point of intersection is taken as the origin of the coordinates. The x axis represents the optical axis and the y axis represents the direction of the CCD line sensor. The position of the light source is expressed as coordinates (x, y). FIG. 5 is a graph which shows the position of a light ring photographed by the CCD line sensor as the semiconductor laser light source moves on the x axis (optical axis). In the graph, the horizontal axis represents the line sensor pixel position and the vertical axis represents light intensity. In the graph, the distances between the semiconductor laser light source and the lens first surface (light source distance) are indicated. It can be observed from FIG. 5 that as the light source distance increases, the diameter of the light ring decreases and vice versa. FIG. 6 summarizes the relation between light source distance x and light ring diameter $D_{y=0}$ which has been known from the graph. $D_{y=0}$ denotes that the y coordinate of the light source is zero.(y=0). In FIG. 6, the horizontal axis represents reciprocal X of light source distance x (X=1/x) while the vertical axis represents the diameter of the light ring in mm. From this graph, it has been found that the diameter of the light ring, $D_{y=0}$, can be accurately approximated by a quadratic expression in X as follows:

$$D_{y=0}=d1*X^2+d2*X+d3 \quad \text{(Expression 1)}$$

In this case, d1=0.0004, d2=0.4078, and d3=8.6003.

Figure 7:
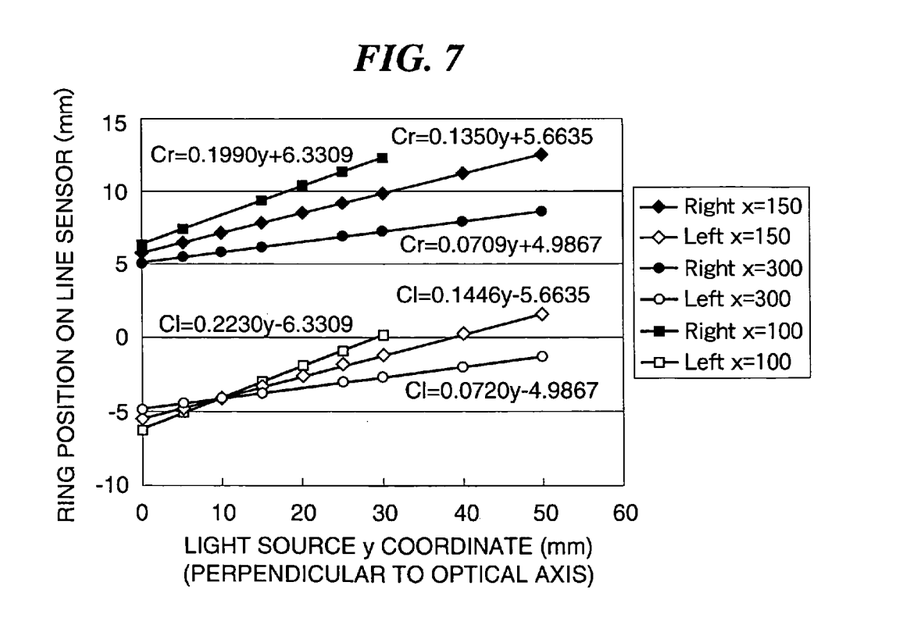
FIG. 7 is a graph showing the relation between the light source moving distance in the direction perpendicular to the optical axis and the position of the light ring.

FIG. 7 is a graph showing the position of the light ring when the light source moves in the y axis direction, which is perpendicular to the optical axis. In the graph of FIG. 7, the horizontal axis represents the y coordinate of the light source (perpendicular to the optical axis) and the vertical axis represents the position of the ring formed by the line sensor. The x coordinate of the light source is fixed to 100 mm, 150 mm, and 300 mm. When the light source is moved in the y axis minus direction, the whole light ring moves in the opposite direction, namely the y axis plus direction. When the coordinates on the line sensor of the right edge and left edge of the light ring are expressed as Cr and Cl respectively, these coordinates can be approximated by a linear expression concerning the light source y coordinate. The coordinates on the line sensor of the left edge and right edge, Cl and Cr, are expressed with respect to the y coordinate of the light source as follows:

$$Cl=al*y-D_{y=0}/2 \quad \text{(Expression 2)}$$

$$Cr=ar*y+D_{y=0}/2 \quad \text{(Expression 3)}$$

where $D_{y=0}$ represents the diameter of the light ring in a condition that the light source is on the optical axis (y=0).

Figure 8:
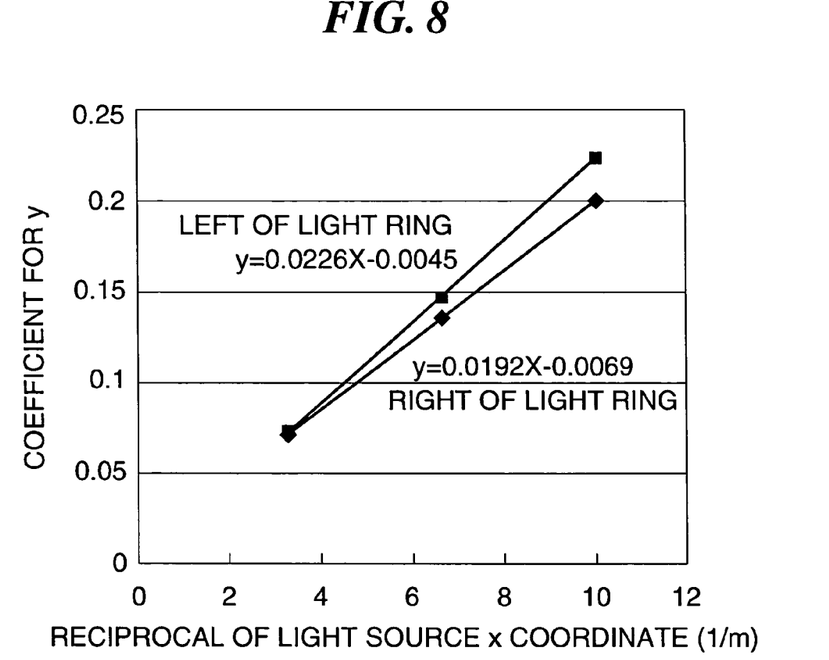
FIG. 8 is a graph showing the relation between the coefficient of light ring movement in the y direction and the x coordinate of the light source.

The coefficients al and ar for y in these expressions are related with the x coordinate of the light source as shown in FIG. 8. In the graph of FIG. 8, the horizontal axis represents reciprocal X (X=1/x) and the vertical axis represents coefficients for y. The coefficients for y are expressed by a linear expression in X as follows:

$$al=b1*X+c1 \quad \text{(Expression 4)}$$

$$ar=b2*X+c2 \quad \text{(Expression 5)}$$

In this case, b1=0.0226, c1=−0.0045, b2=0.0192, and c2=0.0069.

When y is eliminated from the above Expressions 2 and 3 to make an expression in X, and Expressions 1, 4 and 5 are substituted therein, it follows that:

$$(Cl+(d1*X^2+d2*X+d3)/2)/(Cr-(d1*X^2+d2*X+d3)/2)= (b1*X+c1)/(b2*X+c2) \quad \text{(Expression 6)}.$$

This expression can be reduced to the following cubic equation in X: $AX^3+BX^2+CX+D=0$. Therefore, solutions to it can be found analytically. When inappropriate solutions (the value of X is a minus value or imaginary number) are removed from them, one right solution is obtained. That the coordinates of the light source can be analytically obtained is advantageous in that the position of the light source can be measured quickly.

As explained above, the position of the light source on a two-dimensional plane could be actually measured using the line sensor.

Although a semispherical lens was used as an optical lens in the above case, a cylindrical lens may be used instead of the semispherical lens to measure the two-dimensional position of the light source. In this case, the lens cylindrical surface is located perpendicularly to the two-dimensional plane in a way that not a light ring but two light lines are formed on the CCD. Measurement of the two-dimensional position is possible by reading the positions of these light lines with the CCD.

The above example concerns measurement of the two-dimensional position of a light source. It is needless to say that even when the light source is moved three-dimensionally, measurement can be made with the same procedure.

(Embodiment 3)

Figure 9:
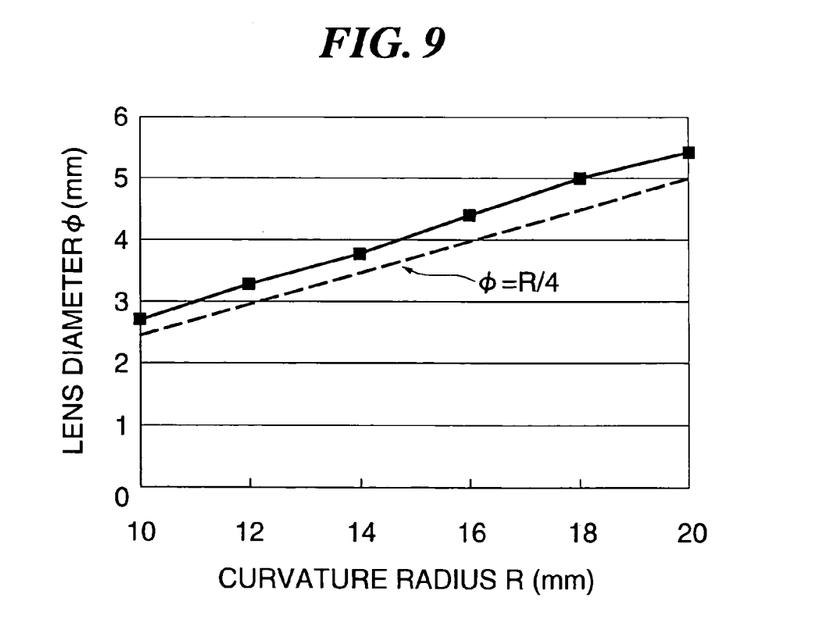
FIG. 9 is a graph showing the relation between the diameter of the lens for formation of a light ring and the curvature radius.

The third embodiment demonstrates that it is desirable that the diameter of the lens, $\phi$, be one quarter of its curvature radius R or more. A simulation was made to find the conditions under which the spherical aberration of a semispherical lens causes light to turn, resulting in the formation of a light ring. In the simulation, the light source was placed on the optical axis 10 m away from the lens and the distance between the CCD and the lens was 1.5 times the lens curvature radius R (from the viewpoint of practicality). The refractive index of the semispherical lens was typical 1.51. FIG. 9 shows the result of the simulation. In the graph of FIG. 9, the horizontal axis represents curvature radius R and the vertical axis lens diameter $\phi$. The values marked with black squares show minimum lens diameters which allow formation of a light ring in a practical condition. For reference, the graph includes a line which represents one quarter of lens curvature radius R. This line virtually coincides with the values marked with black squares. In other words, it has been found that when the diameter of the lens is larger than about one quarter of its curvature radius, light turns due to spherical aberration in a practical condition and a light ring is thus formed.

Although this embodiment uses a semispherical lens, it is not always necessary to use a semispherical lens and any lens may be used as far as it has a large spherical aberration. For example, a spherical lens may be used because it has a large spherical aberration and obviously can form a light ring. When a semispherical lens is used, it need not be perfectly semispherical. For example, if the reverse side of the spherical lens is not flat but concave, the distance of the light source looks shorter and variation in the diameter of the light ring increases as the light source moves on the optical axis.

(Embodiment 4)

Figure 10:
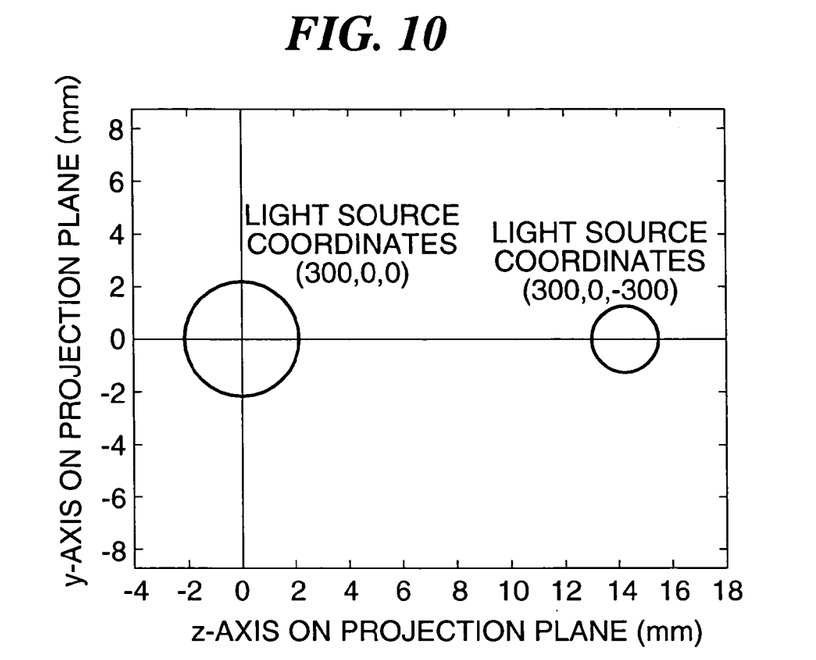
FIG. 10 is a graph explaining movement of a light ring.

The fourth embodiment demonstrates that a semispherical lens with a high refractive index is used and even when the light source is in a wide angle with respect to the lens, turning of light occurs due to the spherical aberration, resulting in formation of a light ring. In this embodiment, the refractive index of the semispherical lens is 1.82 (=n), the curvature radius 20 mm (=R), and the aperture diameter 11 mm (=$\phi$). The distance between the lens and the plane of projection of a light ring is 14.3 mm. The light source was moved on the optical axis from position (300 mm, 0, 0) to position (300 mm, 0, −300 mm) in the field angle of 45 degrees with respect to the optical axis. FIG. 10 shows how the position of the light ring changes. In the graph of FIG. 10, the horizontal axis represents the z axis of the projection plane and the vertical axis the y axis of the projection plane. The light ring moves in the direction opposite to the direction of movement of the light source; therefore, as the light source moves −300 mm along the z axis, the light ring moves in the plus direction of the z axis. When the light source moves −300 mm along the z axis, its distance along the x axis remains unchanged (300 mm) but the slant distance between the light source and the lens increases and thus the size of the light ring decreases. It has been confirmed that the whole light ring is properly formed though the light source is in the field angle of 45 degrees with respect to the center of the lens. Hence, it has been demonstrated that the use of a lens with a high refractive index enables formation of a light ring even with the light source in a wide field angle. Also, using a lens with a low refractive index, a simulation experiment was conducted where the other conditions were the same. However, turning of light due to the spherical aberration did not occur, leading to a failure in formation of a circular light ring. For the above reason, it has been found that when the light source is in a wide field angle, the use of a lens with a high refractive index is effective in formation of a light ring.

Figure 11A:
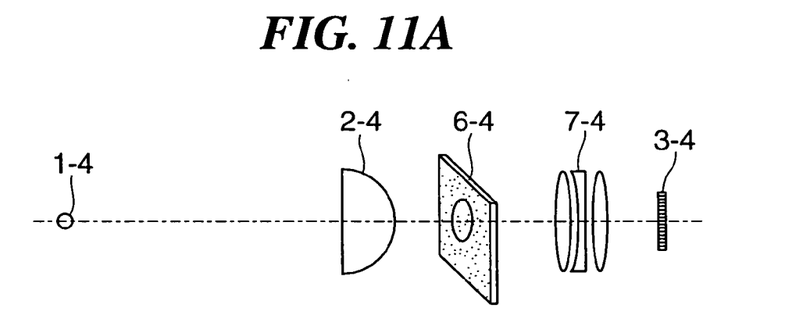
FIG. 11A illustrates a method of detecting a light ring using a diffusion sheet.

In this embodiment, a CCD sensor may be located on the plane of projection of a light ring, but alternatively a translucent diffusion sheet may be placed thereon. If so, as illustrated in FIG. 11A, light from a light source 1-4 is projected by a lens with a large spherical aberration, forming a light ring on a translucent diffusion sheet 6-4. Since this diffusion sheet is translucent, the light ring can be observed from behind. Therefore, the light ring can be detected using a focusing optical system 7-4 and a CCD sensor 3-4. An outstanding feature of this method is that a large translucent diffusion sheet may be used and the light ring may be moved by a longer distance. This implies the possibility of making a position measurement system which copes with wide field angles.

Figure 11B:
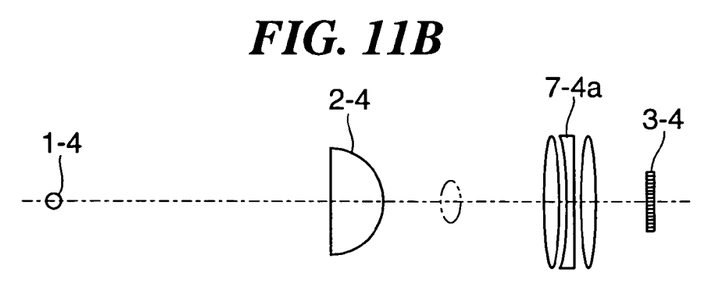
FIG. 11B illustrates a method of detecting a light ring without using a diffusion sheet.

It is also possible to detect a light ring even when a focusing optical system 7-4a and a CCD sensor 3-4 are used but there is no translucent diffusion sheet as illustrated in FIG. 11B. Light rays passing through a lens with a large spherical aberration 2-4 tend to have a wide angle with respect to the optical axis. For these rays to be focused into an image properly, a large diameter lens is needed. When the focusing optical system 7-4a has such a lens, a light ring can be formed on the CCD sensor 3-4. This method offers an advantage that since a medium like a light diffusion sheet is not used, a light ring can be formed on the CCD sensor 3-4 without a drop in light intensity. In other words, the CCD sensor can detect a high-intensity light ring; thus it can detect a clear-cut light ring with less noise.

(Embodiment 5)

Figure 12:
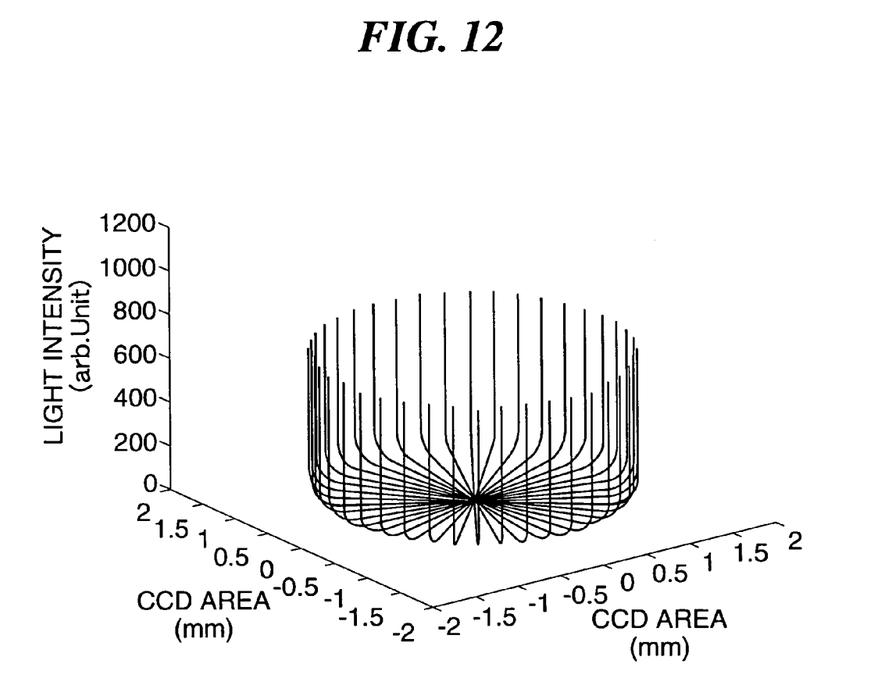
FIG. 12 is a graph showing the result of light ring simulation by a spherical lens.

The fifth embodiment concerns a case that an optical mirror is used for formation of a light ring. In the experiment, a concave spherical mirror with a curvature radius (R) of 20 mm and a diameter of 9 mm was used as an optical mirror. A light source was 300 mm away on the optical axis. A CCD sensor was placed 8 mm from the mirror on the optical axis, facing the light source. In this condition, the intensities of light focused on the CCD sensor were calculated by a simulation. FIG. 12 shows the calculated light intensities. A light ring was formed in this embodiment as when an optical lens is used. Generally speaking, the influence of the spherical aberration of a spherical mirror is larger than that of a spherical lens. As the light source moves on the optical axis, with a spherical mirror, the size of the light ring varies to a larger extent than with a spherical lens; thus it is desirable to use an optical mirror for position measurement with higher accuracy.

Table 1 given below shows practical conditions under which a light ring can be formed due to the spherical aberration of an optical mirror.

TABLE 1

| Curvature radius (mm) | 20 | 25 | 30 | 35 | 40 | 45 | 50 |
|---|---|---|---|---|---|---|---|
| Mirror diameter (mm) | 4 | 5 | 6 | 7 | 8 | 9 | 10 |
| CCD distance (mm) | 10 | 12 | 14.5 | 17 | 19.5 | 22 | 24.5 |

This table suggests that a light ring suitable for practical use is formed when the diameter of the mirror, φ, is approximately one fifth of curvature radius R or more. If the mirror diameter should be smaller than this, the diameter of the light ring would be very small and it might be no longer a ring but just a spot. Hence, it has been found that a light ring is effectively formed due to the spherical aberration of an optical mirror when the diameter of the mirror is one fifth of its curvature radius or more.

As discussed so far, according to the present invention, a position measurement system has the following components: a light source; an optical mirror system which reflects light from the light source and forms an area of light concentration due to its spherical aberration; a light receiving device which detects an area of light concentration as formed by the optical mirror system; and a calculator which measures the position of the light source according to detected information on an area of light concentration as detected by the light receiving device.

(Embodiment 6)

The sixth embodiment concerns a case that three LEDs (red, green, and blue) are used as light sources and each of these LEDs is mounted in a pen and its position is detected by a lens and a CCD sensor.

In an experiment made according to this embodiment, a blue LED with 450 nm wavelength, a green LED with 550 nm wavelength, and a red LED with 670 nm wavelength were respectively mounted in a blue, a green, and a red ink pen. A CCD line sensor camera which can take three color (R, G, B) images was placed in a corner of A3 size paper. This camera incorporates a semispherical lens with a refractive index of 1.82 and a curvature radius of 22 mm. The distance between the CCD line sensor's light receiving surface and the lens was 13 mm. The CCD line sensor camera has three line sensors to take images of R, G, and B tight separately and can identify R, G and B light rings and enter the light ring data into a computer in real time. Using the method explained in the second embodiment, the positions of the blue, green and red pens could be calculated instantly. A picture could be drawn in blue, green and red according to movement of the R, G and B ink pens under an ordinary drawing software program on a personal computer.

In this method, R, G and B light sources can be identified with commercially available color line sensors, which means that it is possible to identify plural light sources easily at low cost and enter the obtained data into a computer. Therefore, the present invention may be applied not only to position measurement systems but also to input devices such as mice, pointers and pen input tools.

Although in this embodiment a light source is mounted in a pen and data on the movement of the pen is entered into a computer in real time, the pen as a moving object may be replaced by a human being or car. Also, LEDs as light sources are identified by their wavelength difference in this embodiment; however, even when light sources have the same wavelength LED, they can be identified with sensors by their time-series emission pattern difference. Even if so, the same effects as in this embodiment can be achieved.

Although LEDs are used in this embodiment, it is not always necessary to use such light emitting devices; instead, it may be possible to use small light reflecting members with a low reflectance. One example is as follows. When a stainless steel ball with a diameter of approximately 1 mm is built in a moving object and irradiated with white light, intense light from the stainless steel ball is reflected in all directions. The light is condensed by an optical device with a large spherical aberration to form a light ring. The light ring is detected by a light receiving device.

As discussed above, the present invention implements a position measurement system which optically measures the position of an object in a simple manner at low cost.

The entire disclosure of Japanese Patent Application No. 2003-002073 filed on Jan. 8, 2003 including specification, claims, drawings and abstract is incorporated herein by reference in its entirety.

What is claimed is:

1. A position measurement system comprising:
    a light source;
    an optical lens system which transmits light from the light source and forms an area of light concentration due to its spherical aberration;
    a light receiving device which detects the area of light concentration as formed by the optical lens system; and
    a calculator which measures a position of the light source according to detected information on the area of light concentration as detected by the light receiving device.

2. The position measurement system according to claim 1, wherein the area of light concentration has a shape of a ring.

3. The position measurement system according to claim 1, wherein the optical lens system includes a convex lens having a first surface for light entrance and a second surface for light exit, the first or second surface is a spherical surface with a curvature radius R, and a diameter of the lens, φ, is R/4 or more.

4. The position measurement system according to claim 3, wherein a thickness of a center of the lens is equal to or larger than the curvature radius R.

5. The position measurement system according to claim 4, wherein the lens is a semispherical lens in the form of a semispherical body as obtained by halving a spherical body or part of a semispherical body, and its first surface is flat and its second surface is spherical.

6. The position measurement system according to claim 1, wherein the area of light concentration has a shape of a line.

7. The position measurement system according to claim 1, wherein the optical lens system includes the convex lens having the first surface for light entrance and the second surface for light exit, and the first or second surface is a cylindrical surface with curvature radius R.

8. The position measurement system according to claim 1, wherein the optical lens system includes a lens having a first surface for light entrance and a second surface for light exit, and the first surface is a concave surface and the second surface is a convex and spherical or cylindrical surface.

9. The position measurement system according to claim 1, wherein the optical lens system includes the lens having the first surface for light entrance and the second surface for light exit, the first surface is a convex and spherical or cylindrical surface and the second surface is a flat surface, and the light receiving device is tightly attached to the second surface.

10. The position measurement system according to claim 1, wherein the optical lens system has a spherical lens, a cylindrical lens or a barrel lens.

11. A position measurement system comprising:

a light source;

an optical mirror system which reflects light from the light source and forms an area of light concentration due to its spherical aberration;

a light receiving device which detects the area of light concentration as formed by the optical mirror system; and a calculator which measures a position of the light source according to detected information on the area of light concentration as detected by the light receiving device.

12. The position measurement system according to claim 11, wherein the area of light concentration has a shape of a light ring.

13. The position measurement system according to claim 11, wherein the optical mirror system includes a spherical mirror with a curvature radius R and a diameter of the mirror, $\phi$, is R/5 or more.

14. The position measurement system according to claim 1, wherein the light source is mounted in a moving body.

15. The position measurement system according to claim 14, wherein the light source has plural light sources which are different in emission wavelength or time-series emission pattern.

16. The position measurement system according to claim 1, wherein the light source is a light reflecting member which reflects light from outside.

17. The position measurement system according to claim 1, wherein the light receiving device is a digital camera having a focusing optical system.

18. A position determining system comprising:

a light source for emitting a light;

an optical system having a spherical aberration wherein the spherical aberration forms a concentrated area of the light;

a detector that detects an information corresponding to the concentrated area; and a calculator that determines a position of the light source based on the information.

19. The position determining system according to claim 18, further comprising a light diffusing member between the optical system and the detector.

20. The position determining system according to claim 18, further comprising a movable element, wherein the light source is mounted on the movable element.

* * * * *